United States Patent
Chen et al.

(10) Patent No.: US 10,219,134 B2
(45) Date of Patent: Feb. 26, 2019

(54) BLUETOOTH LOW ENERGY BASED EMERGENCY BACKUP AND RECOVERY SOLUTION IN AN INDUSTRIAL CONTROLLER

(71) Applicant: Honeywell International Inc., Morris Plains, NJ (US)

(72) Inventors: Longfei Chen, Shanghai (CN); Zhi Yang, Shanghai (CN); Haifeng Liang, Shanghai (CN); Lei Zou, Shanghai (CN)

(73) Assignee: Honeywell International Inc., Morris Plains, NJ (US)

( * ) Notice: Subject to any disclaimer, the term of this patent is extended or adjusted under 35 U.S.C. 154(b) by 132 days.

(21) Appl. No.: 15/279,376

(22) Filed: Sep. 28, 2016

(65) Prior Publication Data

US 2018/0088646 A1     Mar. 29, 2018

(51) Int. Cl.
| | |
|---|---|
| *H04W 4/00* | (2018.01) |
| *H04W 4/80* | (2018.01) |
| *G05B 19/042* | (2006.01) |
| *G06F 1/26* | (2006.01) |
| *G06F 1/30* | (2006.01) |
| *G06F 11/14* | (2006.01) |
| *H04W 52/02* | (2009.01) |

(52) U.S. Cl.
CPC ............ *H04W 4/80* (2018.02); *G05B 19/042* (2013.01); *G06F 1/263* (2013.01); *G06F 1/30* (2013.01); *G06F 11/1456* (2013.01); *H04W 52/0225* (2013.01)

(58) Field of Classification Search
CPC ..... G06F 1/30; G06F 1/28; G06F 1/26; G06F 1/32; G06F 1/3203
See application file for complete search history.

(56) References Cited

U.S. PATENT DOCUMENTS

| | | |
|---|---|---|
| 8,406,220 B2 | 3/2013 | McLaughlin et al. |
| 9,065,813 B2 | 6/2015 | Kolavennu et al. |
| 9,405,285 B2 | 8/2016 | Powell et al. |
| (Continued) | | |

OTHER PUBLICATIONS

Venkateswaran Chittoor Gopalakrishnan, et al., "In-Field Wireless Access to Smart Instruments Using Bluetooth Low Energy," U.S. Appl. No. 15/177,217, filed Jun. 8, 2016, 27 pages.

*Primary Examiner* — Jaweed A Abbaszadeh
*Assistant Examiner* — Alyaa T Mazyad

(57) ABSTRACT

An apparatus includes a BLUETOOTH low energy (BLE) based emergency backup and recovery tool. The tool includes a backup power source that stores electric energy and outputs electric energy when a main power source is off. The tool includes a shared memory accessible by a processor and a BLE module. The shared memory stores information written by the processor, and operates using at least some of the electric energy output from the backup power source when the main power source is off. The tool includes the BLE module coupled to the backup power source. The BLE module operates using at least some of the electric energy output from the backup power source when the main power source is off, reads the information stored in the shared memory, and transmits the information to an external device through a wireless communication channel using a BLUETOOTH communication protocol.

17 Claims, 4 Drawing Sheets

(56) References Cited

U.S. PATENT DOCUMENTS

2008/0010514 A1* 1/2008 Liu .................... G06F 1/30
                                                714/14
2016/0283145 A1* 9/2016 Han ................. G11C 5/141
2016/0366263 A1* 12/2016 Song ................ H04W 4/90

* cited by examiner

BLUETOOTH LOW ENERGY BASED EMERGENCY BACKUP AND RECOVERY SOLUTION IN AN INDUSTRIAL CONTROLLER

TECHNICAL FIELD

This disclosure is generally directed to industrial process control and automation systems. More specifically, this disclosure is directed to a system and method for BLUETOOTH Low Energy (BLE) based emergency backup and recovery in an industrial controller.

BACKGROUND

In an industrial facility or industrial field site, when an industrial automation controller is broken down, for example, as a result of a controller function failure or some other reason, it is very difficult to access the latest information and status of the industrial automation controller before the industrial automation controller broke down (together referred to as "pre-breakdown information"). The pre-breakdown information includes retained data, time of power down, and application crash data. In the case of a controller function failure, there is a difficulty because in order to access the pre-breakdown information, the industrial automation controller must be repaired first. In the case of a power off status, an operator must first find a backup power source and attach it to the industrial automation controller, and then extract needed data.

SUMMARY

This disclosure provides an apparatus, system, and method for BLUETOOTH Low Energy (BLE) based emergency backup and recovery in an industrial controller.

In a first example, a method includes, when a main power source is off, outputting electric energy from storage within a backup power source. The method includes storing information in a shared memory that is written by a processor. The shared memory is configured to be accessed by the processor and a BLE module. The shared memory is also configured to operate using at least some of the electric energy output from the backup power source when the main power source is off. The method includes reading, by the BLE module, the information stored in the shared memory. The BLE module is coupled to the backup power source. The BLE module is configured to operate using at least some of the electric energy output from the backup power source when the main power source is off. The method also includes transmitting, by the BLE module, the information to an external device through a wireless communication channel using a BLUETOOTH communication protocol.

In a second example, an apparatus includes a backup power source, a shared memory, and a BLE module. The backup power source is configured to store electric energy and to output electric energy when a main power source is off. The shared memory is configured to be accessed by a processor and a BLE module, to store information written by the processor, and to operate using at least some of the electric energy output from the backup power source when the main power source is off. The BLE module is coupled to the backup power source. The BLE module is configured to operate using at least some of the electric energy output from the backup power source when the main power source is off, to read the information stored in the shared memory, and to transmit the information to an external device through a wireless communication channel using a BLUETOOTH communication protocol.

In a third example, a system includes an industrial controller configured to control an industrial process in an industrial facility. The industrial controller includes a processor configured to operate when a main power source is on. The system includes a BLE based emergency backup and recovery tool coupled to the industrial controller. The tool includes a backup power source, a shared memory, and a BLE module. The backup power source is configured to store electric energy and to output electric energy when the main power source is off. The shared memory is configured to be accessed by the processor and a BLE module, to store information written by the processor, and to operate using at least some of the electric energy output from the backup power source when the main power source is off. The BLE module is coupled to the backup power source. The BLE module is configured to operate using at least some of the electric energy output from the backup power source when the main power source is off, to read the information stored in the shared memory, and to transmit the information to an external device through a wireless communication channel using a BLUETOOTH communication protocol.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 5, discussed below, and the various examples used to describe the principles of the present invention in this patent document are by way of illustration only and should not be construed in any way to limit the scope of the invention. Those skilled in the art will understand that the principles of the present invention may be implemented in any suitable manner and in any type of suitably arranged device or system.

Figure 1:
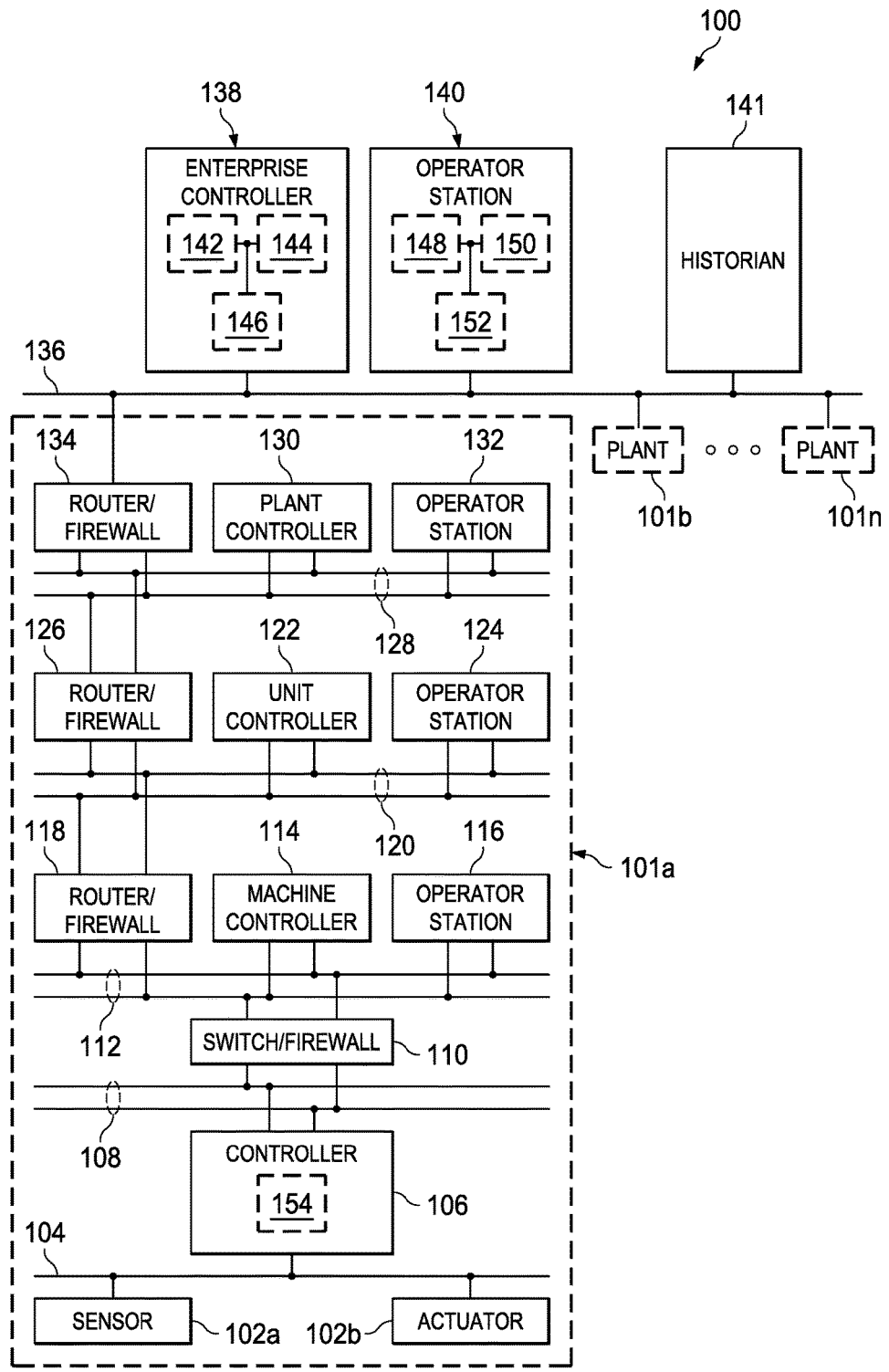
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. Each controller 106 could, for example, represent a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102*a*, and actuators 102*b*).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101*a*-101*n*, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101*a*-101*n* and to control various aspects of the plants 101*a*-101*n*. The enterprise-level controllers 138 can also perform various functions to support the operation and control of components in the plants 101*a*-101*n*. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101*a* is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers could include one or more processing devices 142 and one or more memories 144 for storing instructions and data used, generated, or collected by the processing device(s) 142. Each of the controllers could also include at least one network interface 146, such as one or more Ethernet interfaces or wireless transceivers. Also, each of the operator stations could include one or more processing devices 148 and one or more memories 150 for storing instructions and data used, generated, or collected by the processing device(s) 148. Each of the operator stations could also include at least one network interface 152, such as one or more Ethernet interfaces or wireless transceivers.

In accordance with this disclosure, one or more controllers 106 can include a BLUETOOTH Low Energy (BLE) based emergency backup and recovery tool 154, in which BLE technology is used to easily and quickly access pre-breakdown information from the controller 106. In certain embodiments, the tool 154 can be added to a legacy controller 106. In other embodiments, the controller 106 is designed to include the tool 154. The tool 154 provides a BLE module, shared memory, and backup power source to the controller 106. With the tool 154, the controller 106 writes to the shared memory during normal operations (namely, operations during a power on status and without a function failure or fault), and then in the event of a breakdown, the tool 154 reads and transfers pre-breakdown information from the shared memory to another device via a BLE communication channel. For example, a mobile device 300

(shown in FIG. 3) with BLE functions can be used to access the pre-breakdown information through the BLE module inside the industrial automation controller 106. Additional details regarding this functionality are provided below.

Although FIG. 1 illustrates one example of an industrial process control and automation system 100, various changes may be made to FIG. 1. For example, a control system could include any number of sensors, actuators, controllers, servers, operator stations, networks, and other components. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, process control systems are highly configurable and can be configured in any suitable manner according to particular needs. In addition, FIG. 1 illustrates an example environment in which BLE-based emergency backup and recovery in an industrial controller can be used. This functionality can be used in any other suitable device or system.

Figure 2:
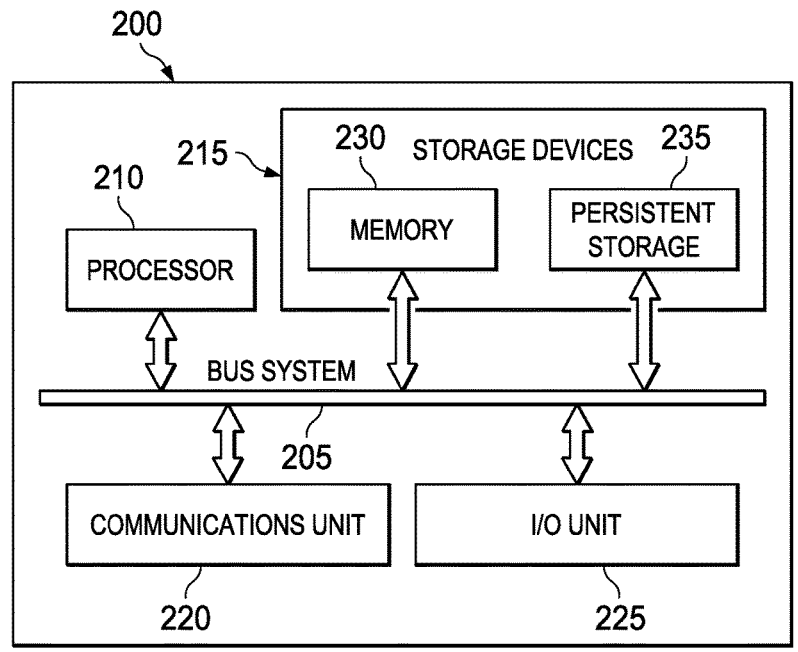
FIG. 2 illustrates an example device supporting BLE-based emergency backup and recovery in an industrial controller according to this disclosure.

FIG. 2 illustrates an example device 200 supporting BLE-based emergency backup and recovery in an industrial controller according to this disclosure. The device 200 could, for example, represent a controller 106, a mobile device 300 (shown in FIG. 3) or other computing device executing or otherwise supporting or providing the tool 154.

As shown in FIG. 2, the device 200 includes a bus system 205, which supports communication between at least one processor 210, at least one storage device 215, at least one communications unit 220, and at least one input/output (I/O) unit 225. The processor 210 executes instructions that may be loaded into a memory 230. The processor 210 may include any suitable number(s) and type(s) of processors or other devices in any suitable arrangement. Example types of processors 210 include microprocessors, microcontrollers, digital signal processors, field programmable gate arrays, application specific integrated circuits, and discrete circuitry. For example, in a case in which the device 200 represents the controller 106, the processor 210 can execute instructions provided by the tool 154, enabling the device 200 to execute a method of BLE-based emergency backup and recovery.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). For example, in a case in which the device 200 represents the controller 106, the memory 230 could include a shared memory of the tool 154 that stores information that is accessible by the processor 210 as well as by a stand-alone BLE module within the communications unit 220. The persistent storage 235 may contain one or more components or devices supporting longer-term storage of data, such as a read only memory, hard drive, Flash memory, or optical disc. In certain embodiments, persistent storage 235 could include instructions provided by the tool 154, which when executed by the processor 210, enable the device 200 to perform various operations within a method of BLE-based emergency backup and recovery in an industrial controller.

The communications unit 220 supports communications with other systems or devices. For example, the communications unit 220 could include a network interface card or a wireless transceiver facilitating communications over the network 104, 108. The communications unit 220 may support communications through any suitable physical or wireless communication link(s). More particularly, the communications unit 220 could include a transmitter and a receiver for communicating with external devices. For example, in a case in which the device 200 represents the controller 106, the communications unit 220 can include a standalone BLE module configured to communicate with external devices by a wireless communication channel according to a BLE protocol. In a case in which the device 200 represents a mobile device 300 (shown in FIG. 3), the communications unit 220 can include a BLE module configured to receive pre-breakdown information from the controller 106 via a BLUETOOTH wireless communication channel. The BLE module includes both hardware and firmware. In certain embodiments, a BLE module is an integrated circuit that includes a BLUETOOTH baseband controller, radio, crystal, antenna, low dropout regulator (LDO), and discreet circuit components, combined to form a BLUETOOTH node.

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

Although FIG. 2 illustrates one example of a device 200 supporting BLE-based emergency backup and recovery in an industrial controller, various changes may be made to FIG. 2. For example, computing devices come in a wide variety of configurations. The device 200 shown in FIG. 2 is meant to illustrate one example type of computing device and does not limit this disclosure to a particular type of computing device.

Figure 3:
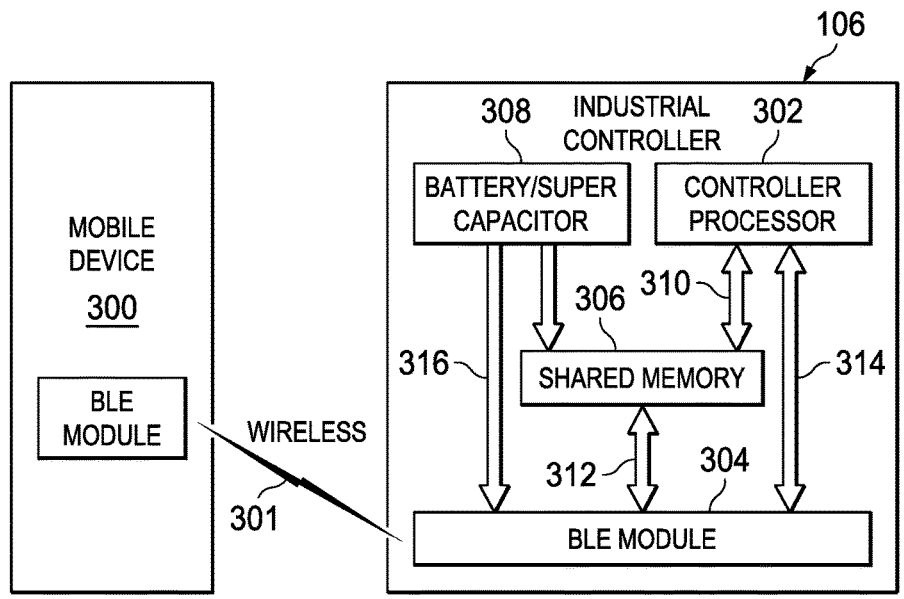
FIG. 3 illustrates an industrial controller communicably coupled to a mobile device via a BLUETOOTH wireless communication channel according to this disclosure.

FIG. 3 illustrates an industrial controller 106 communicably coupled to a mobile device 300 via a BLUETOOTH wireless communication channel 301 according to this disclosure.

As shown in FIG. 3, the mobile device 300 could be a cellular phone, tablet computer, or laptop computer, or the like. The mobile device 300 is configured to communicate wirelessly over the wireless communication channel 301 with the controller 106 via a wireless communication protocol, namely, the BLUETOOTH low energy wireless communication protocol. That is, mobile device 300 includes components configured to perform BLE communication, and as such, could include a BLE module. With wireless BLE technology, the operators and maintenance technicians no longer need to find the controller 106 in the work area of the industrial facility in order to physically connect to the controller 106, but instead, can simply carry the mobile device 300 into the control room and connect it to the controller 106 wirelessly via the wireless communication channel 301. This change, from physical to wireless connection, will decrease the time needed to repair a failure of the controller 106.

The industrial controller 106 includes a processor 302 and a BLE-based emergency backup and recovery tool 154. The tool 154 includes a stand-alone BLE module 304, a shared memory 306, and a backup power supply 308. The controller 106 could be a Programmable Logic Controller (PLC) or a Distributed Control System (DCS) controller to which the tool 154 has been added, or alternatively, could be a controller with a native BLE module 304. That is, in certain embodiments, the controller 106 could include the BLE module 304 on the same circuit board as the processor 302.

During normal operations, the controller 106 (including its components 302, 304, 306, and 308) is powered by a main power source. However, during an emergency, the controller 106 stops receiving power from the main power source, and instead, the backup power source 308 provides emergency backup power to the controller 106, enabling the controller 106 to perform emergency operations. An emergency may occur when the main power of the controller 106 is OFF, or may occur when the controller 106 fails or has a power off status or experiences a component failure or function failure, such as a fault or failure of the processor 302. During the emergency, the backup power source 308, inside the controller 106, will continue to provide power to the BLE module 304 and the shared memory 306. In a specific example, the backup power source 308 is able to provide continuous power for a long period of time, such as two days, enabling these components to perform emergency operations. The backup power source 308 could be a super capacitor or a battery. A super capacitor is composed of a material that has superior energy storage properties compared to the material of a conventional capacitor. The life of a super capacitor is longer than the life of a battery, as the super capacitor has a greater number of recharge/discharge cycles. The backup power source 308 could be charged or recharged when the main power of the controller 106 is ON, and can discharge by providing electric energy to the tool 154 when the main power of the controller 106 is OFF. That is, in certain embodiments, the backup power source 308 includes a rechargeable backup power source, such as a rechargeable battery, which receives electric energy from the main power of the controller when the main power is ON, and can use the electric energy for charging and recharging.

The processor 302 could be a microcontroller or a microprocessor unit (MPU) that is connected to the shared memory 306 through a wired connection 310 and that writes critical information to the shared memory 306. The critical information includes information for emergency repair of the industrial controller 106, such as repair of the processor 302. The critical information can be used to indicate why the controller 106 failed, which can be helpful in order to repair the controller properly. The critical information could include data from the failed controller, which when copied to another industrial controller, thereby provides an identical, yet functional, replacement. User selections, such as selections by an operator of an operator station, can be a basis upon which the processor 302 determines which information is critical. The operations of the processor 302 may require a higher level of power than can be provided by the backup power source 308. Alternatively, the energy capabilities of the backup power source 308 may be insufficient to support the energy requirements of the processor 302; as such, the processor 302 is not connected to the backup power source 308.

The shared memory 306 stores critical information that is shared between the processor 302. The shared memory 306 could be any suitable memory or storage device that not only continues to work on backup power, but also, is doubly accessible by the BLE module 304 and the processor 302. For example, the shared memory 306 could be a ROM or RAM. In certain embodiments, the shared memory 306 is a memory of the BLE module 304 or a memory of the controller processor 302, such as a RAM within the BLE module 304. In other embodiments, the shared memory 306 is memory storage connected to the BLE module 304 via a wired connection 312. Also, in certain embodiments, the shared memory 306 includes both the memory of the BLE module 304 and a memory storage connected to the BLE module 304.

The BLE module 304 receives power from the main power source of the controller 106, during normal operations. However, the BLE module 304 includes its own processor, which controls the functions of the BLE module 304, such as by using firmware. The BLE module 304 reads from and writes to the shared memory 306. In certain embodiments, the BLE module 304 performs the read and write functions with the shared memory 306 via a wired connection 312. The BLE module 304 is connected to the processor 302 via a wired connection 314, such as a serial peripheral interface (SPI) or a universal asynchronous receiver/transmitter (UART) bus or an inter-integrated circuit ($I^2C$) connection, and during normal operations, communicates bi-directionally with the processor 302. The BLE module 304 determines to switch to sleep mode in response to detecting a communication problem with the processor 302 via the wire connection 314. The BLE module 304 remains in sleep mode until the mobile device 300 connects to the BLE 304. Once connected to the mobile device 300, the BLE 304 can access the shared memory 306, and transfer pre-breakdown information (including the critical information) from the shared memory 306 to the mobile device 300.

The BLE module 304 is a stand-alone component of the controller 106, as the BLE module 304 can operate independent from or without the processor 302. When the other components of the controller 106 have a functional failure, the BLE module 304 remains operational. The BLE module 304 consumes a low amount of energy, and is very suitable for low power usage. As such, during an emergency, the BLE module 304 receives low level of power from the backup power source 308 through a power line connection 316, thereby does not quickly drain the energy stored in the backup power source 308. Although the BLE module 304 is suitable for low power usage in normal mode, the BLE module 304 uses even less power while in sleep mode. Accordingly, the BLE module 304 can continue working for a long time, ensuring that the information stored in the shared memory 306 will not be lost before an operator or maintenance technician uses the mobile device 300 to transfer the pre-breakdown information through the BLE module 304.

In industrial controllers without BLE capabilities, a memory card, such as a secure digital (SD) card or the like, could be used to store the critical information and other pre-breakdown information. However, memory cards have a limited quantity of write times (e.g., one hundred thousand write cycles), so the critical information cannot be written to the card frequently, namely, as frequently as the critical information is generated. In contrast, the industrial components according to this disclosure include a BLE module, such as the industrial controller 106, and the pre-breakdown information (including critical information) can be stored in the shared memory 306 very frequently. This enables the controller 106 to provide access to the latest information generated before the break down.

The BLE module 304 is not only used for backup and recovery of a failed industrial controller, but also can be used in a functional, replacement industrial controller 106 through which to easily copy the recovered pre-breakdown information. That is, the mobile device 300 can receive pre-breakdown information recovered through a BLUETOOTH wireless communication channel connected to a failed controller 106, and then transmit the recovered pre-breakdown information through another BLUETOOTH wireless communication channel to a new, replacement industrial controller 106. More particularly, the mobile device 300 includes an application, which is executable on a PC or mobile device, to finish the communication with the failed controller, and also to read and write the data with the controller 106. This enables the industrial process dependent upon the failed industrial controller to resume using the replacement controller 106, without waiting for the replacement controller to be programmed or otherwise configured via a physical wired connection.

Although FIG. 3 illustrates one example of an industrial controller 106 communicably coupled to the mobile device 300 via a BLUETOOTH wireless communication channel 301, various changes may be made to FIG. 3. For example, controllers and mobile devices come in a wide variety of configurations. The industrial controller 106 and mobile device 300 shown in FIG. 3 are meant to illustrate one example type of a system supporting BLE-based emergency backup and recovery in an industrial controller, and do not limit this disclosure to a particular type of industrial controller and mobile device. For example, BLE-based emergency backup and recovery technique is not limited to an industrial controller, but also could be used in any non-redundant computing device without a backup power source and without a memory that is accessible post failure of the device. As another example, the industrial controller 106 may be configured (e.g., with firmware) to transfer critical data directly to the BLE module memory as shared memory 306, to a separate shared memory, or to both, depending on the hardware architecture.

Figure 4:
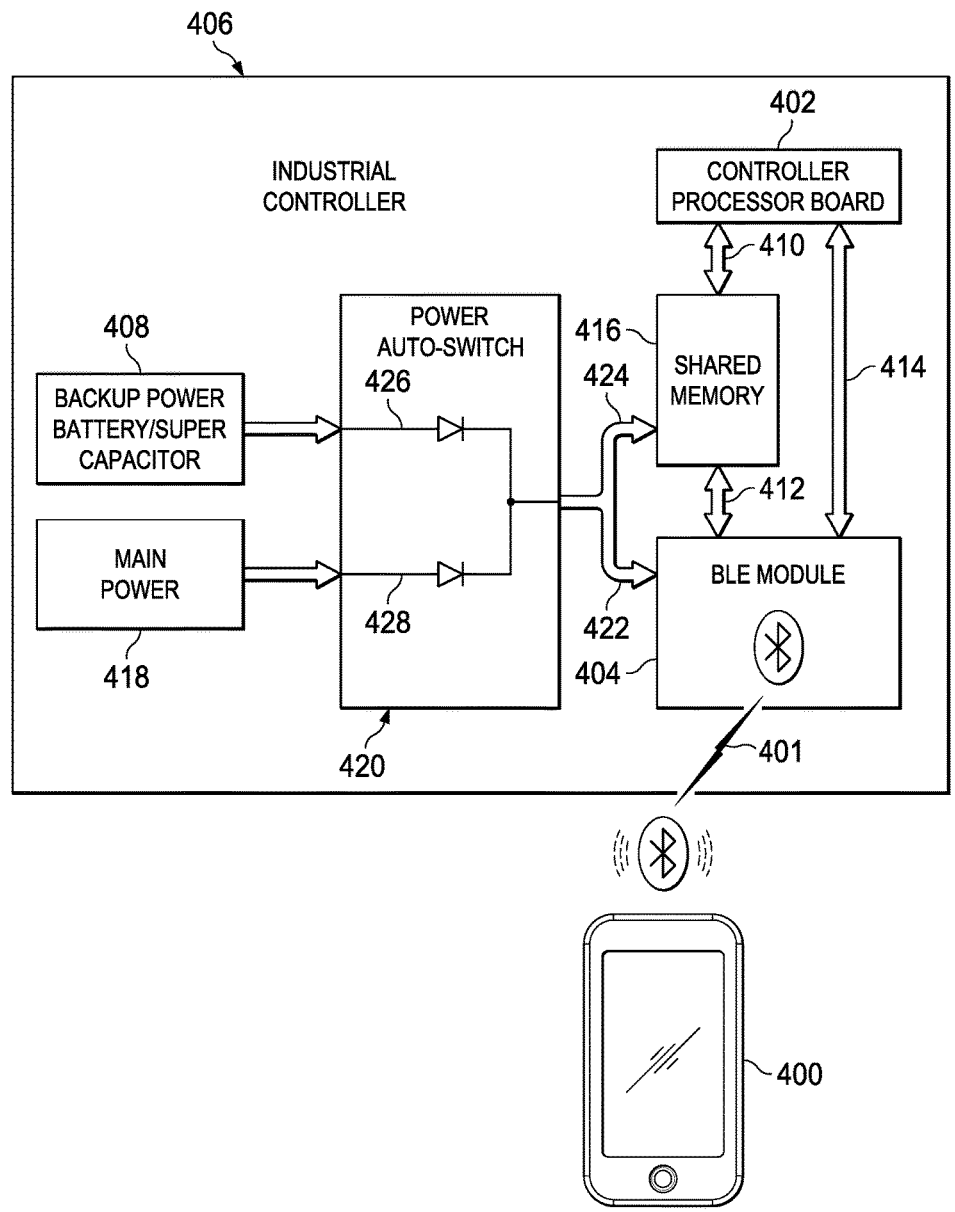
FIG. 4 illustrates an industrial controller according to this disclosure.

FIG. 4 illustrates an industrial controller 406 according to this disclosure. As shown in the example in FIG. 4, the industrial controller 406 is communicably coupled to a smartphone 400 (or other suitable mobile device) via a BLUETOOTH wireless communication channel 401. Note that the industrial controller 406 of FIG. 4 could be the same as or similar to the industrial controller 106 of FIG. 3. The components 402, 404, 416, 408, 410, 412, 414, and 422 of the controller 406 of FIG. 4 could be the same as or similar to corresponding components 302, 304, 306, 308, 310, 312, 314, and 316 of the controller 106 in FIG. 3, and perform the same functions as described with reference to the correspondent components. That is, the industrial controller 406 could be used in the system of FIG. 1.

Note that the smartphone 400 of FIG. 4 is a specific example of the mobile device 300 of FIG. 3. The components in the mobile device 300 in FIG. 3 could be included in the smartphone of FIG. 4, and perform the same functions as described with reference to the correspondent components. Also, components of the smartphone 400 could be included in the mobile device 300 and perform the same functions as described below. For example, the smartphone 400 includes a touch screen display configured to display information and to permit a user (e.g., operator or maintenance technician) to enter information.

In the controller 406, the BLE module 404 and the shared memory 416 are normally powered by the main power source 418 (via power lines 422 and 424), but are switched to receive power from the backup power source 408 when the main power source 418 is off. The controller 406 includes a power automatic switch 420 that performs this switch function very quickly, such that the BLE module 404 will not power down during the switch. The power automatic switch 420 is connected to and receives electric energy from the backup power source 408 and main power source 418. Also, the power automatic switch 420 is connected to and outputs at least some of the received electric energy to the BLE module 404 and the shared memory 416. The switching function is performed by hardware; no firmware action is needed. For example, the power automatic switch 420 includes one or more diodes that receive electricity from the backup power source 408 and main power source 418 and provide the electricity to the BLE module 404 and the shared memory 416, such as through a common power supply node. In certain embodiments, one diode 426 is connected to and receives from the backup power source 408, and another diode 428 is connected to and receives from the main power source 418. When the voltage of the main power source 418 is below a threshold value, the level of power provided to the BLE module 404 may trigger the backup mode and cause the BLE module 404 to enter sleep mode. For example, the BLE module 304 compares the voltage from the common power supply node to a threshold value in order to determine whether to continue operating in a normal mode or to switch to backup mode. That is, in backup mode, the BLE module 304 receives power from the backup power source 308 instead, because the voltage from the main power source is too low.

Figure 5:
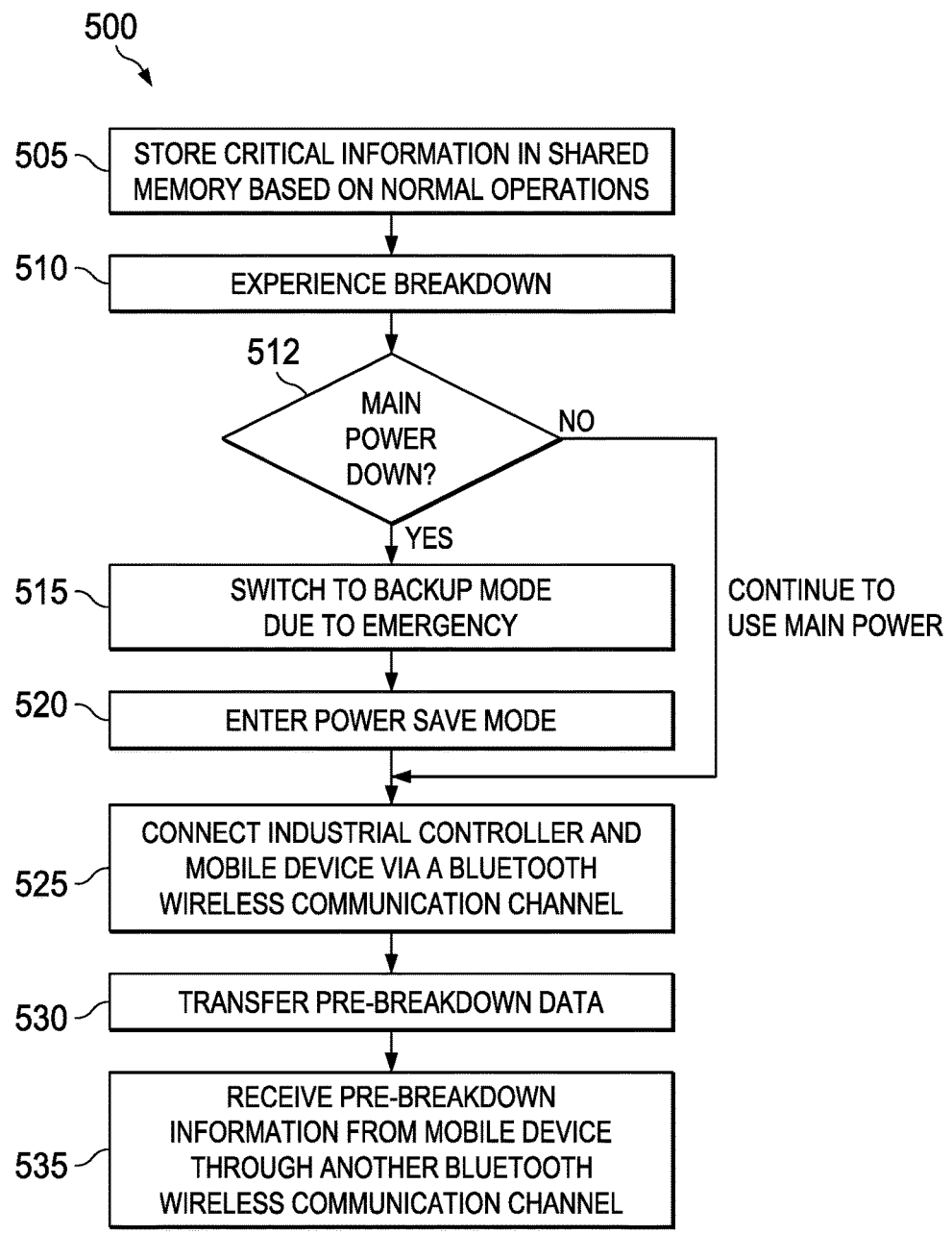
FIG. 5 illustrates a method for BLE-based emergency backup and recovery in an industrial controller according to this disclosure.

FIG. 5 illustrates a method 500 for BLUETOOTH Low Energy (BLE) based emergency backup and recovery in an industrial controller according to this disclosure. The method 500 can be performed by the BLE-based emergency backup and recovery tool 154, or by an industrial controller 106, 406 according to embodiments of this the present disclosure. For purposes of simplicity, the method 500 will be describes as if implemented by the controller 406.

At the start of the method, the controller 406 has been configured to store critical information and other pre-breakdown information in the shared memory 416 according to default and user-defined settings. In block 505, the controller 406 stores critical information in the shared memory 306 based on normal operations. For example, as normal operations, the controller 406 sends control signals to and receives sensor measurements from field devices, such as the actuators 102b and sensors 102a. The critical information could include a status of one or more field devices. The critical information could also include the important runtime data of the controller 406.

In block 510, the controller 406 experiences a breakdown, such as a function failure or power OFF state. For example, the main power source 418 may turn off or otherwise stop providing electric energy sufficient to for normal operations of the controller 406. In certain circumstances, although the controller 406 experiences a breakdown, the main power source can remain functional and remain ON.

In block 512, the controller 406 determines whether the main power source 408 is OFF. For example, the controller 406 can determine whether the main power source 408 experienced a breakdown. When the controller 406 determines that the main power source 408 is OFF or otherwise not providing electric energy to the controller 406, the controller 406 performs the operation of block 515 based on the result of this determination. When the controller 406 determines that that the main power source 408 is ON or otherwise providing electric energy to the controller 406, the controller 406 performs the operation of block 525 based on the result of this determination while continuing to use electric energy provided from the main power source 408. When the main power source remains ON although the controller 406 experiences the breakdown, the BLE module 404 can continue to receive and use electric energy provided by the main power source and can either continue to operate in normal mode or enter a power save mode.

In block 515, the controller 406 switches to backup mode due to the breakdown, which can be referred to as a cause of an emergency. During the emergency, the controller 406 is unable to control or communicate with field devices. While in backup mode, the controller 406 receives power from the backup power source 408, but does not receive power from the main power source 418. For example, the power automatic switch 420 switches the controller 406 to receive electric energy from the backup power source 408. As another example, the processor 402, in response to detecting insufficient power from the main power source 408, switches to an OFF state. As another example, a function failure of the processor 402 is considered an emergency breakdown, which causes the controller 406 to switch to the backup mode.

In block 520, the controller 406 enters power save mode, while in backup mode. For example, the BLE module 404 switches from normal mode to sleep mode. The sleep mode of the BLE module 404 is an example of a power save mode, in which less electric energy is consumed than during normal mode.

In block 525, the controller 406 connects to a mobile device 300 through a BLUETOOTH wireless communication channel. For example, the BLE module 404 detects a request to establish a BLUETOOTH wireless communication channel 401, transmitted from the smartphone 400, and in response awakens out of sleep mode. The BLE module 406 responds to the request, and establishes the BLUETOOTH wireless communication channel 401 connected to the smartphone 400.

In block 530, the controller 406 transfers pre-breakdown information to the mobile device through the BLUETOOTH wireless communication channel. For example, the BLE module 404 accesses the shared memory 416 to read the pre-breakdown information (including the critical information stored in block 505), and transmits the pre-breakdown information to the smartphone 400 through the BLUETOOTH wireless communication channel 401.

In certain embodiments, the method 500 could also include block 535, in which the controller 406 receives critical information from a mobile device 300 through another BLUETOOTH wireless communication channel. For example, as a replacement controller (e.g., new or refurbished), the controller 406 receives pre-breakdown information, which has been recovered from a failed controller, from the smartphone 400 through a BLUETOOTH wireless communication channel. The BLE module 404 can configure the processor 402 of the replacement controller by providing recovered pre-breakdown information through the wired connection 414 and/or through the shared memory 416. That is, the recovered pre-breakdown information can include configuration information that is used to configure the processor of the replacement controller to perform functions that the failed controller had been configured to perform prior to breaking down.

In another embodiment, the mobile device 300 performs a method for BLUETOOTH Low Energy (BLE) based emergency backup and recovery in an industrial controller according to embodiments of the present disclosure. For example, a human machine interface (HMI) in an operator station may provide an alarm or indicator to an operator or maintenance technician that the industrial controller 106 is not performing normal operations. The operator may carry the mobile device 300 into the industrial facility and close enough to use the BLE module of the mobile device 300 to connect to the BLE module 304 of the broken-down industrial controller 106 through the BLUETOOTH wireless communication channel 301. That is, the mobile device 300 receives user input selecting to establish the BLUETOOTH wireless communication channel 301, and in response transmits a request to the mobile device 300 to establish the channel 301. Once the channel 301 is established, the mobile device 300 recovers pre-breakdown information from the broken-down industrial controller 106 by receiving and storing the recovered information in a memory associated with the mobile device.

Although FIG. 5 illustrates a series of steps, various steps in each figure could overlap, occur in parallel, or occur any number of times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed:
1. A method comprising:
when a main power source is off, outputting electric energy from storage within a backup power source;
storing information in a shared memory that is written by a processor, wherein the shared memory is configured to be accessed by the processor and a BLUETOOTH low energy (BLE) module and to operate using at least some of the electric energy output from the backup power source when the main power source is off;

switching the BLE module to a power save mode in response to detecting a communication problem with the processor via a wire connection between the BLE module and the processor;
switching the BLE module out of a power save mode in response to the BLE module receiving a communication from an external device;
reading, by the BLE module, the information stored in the shared memory, wherein the BLE module is coupled to the backup power source, and wherein the BLE module is configured to operate using at least some of the electric energy output from the backup power source when the main power source is off; and
transmitting, by the BLE module, the information to an external device through a wireless communication channel using a BLUETOOTH communication protocol.

2. The method of claim 1, further comprising:
providing electric energy to the shared memory and to BLE module through an automatic switch by:
when the main power source is on, receiving electric energy from the main power source; and
when the main power source is off, switching to receive electric energy from the backup power source.

3. The method of claim 1, further comprising:
switching the BLE module to a power save mode when a voltage output from the main power source is below a threshold value.

4. The method of claim 1, further comprising:
transmitting the information to the external device through the wireless communication channel after switching out of the power save mode.

5. The method of claim 1, further comprising:
receiving configuration information through the BLE module, the configuration information transmitted to the BLE module from an external device through another wireless communication channel using the BLUETOOTH communication protocol.

6. An apparatus comprising:
a backup power source configured to store electric energy and to output electric energy when a main power source is off;
a shared memory configured to be accessed by a processor and a BLUETOOTH low energy (BLE) module, to store information written by the processor, and to operate using at least some of the electric energy output from the backup power source when the main power source is off;
switching the BLE module to a power save mode in response to detecting a communication problem with the processor via a wire connection between the BLE module and the processor;
switching the BLE module out of a power save mode in response to the BLE module receiving a communication from an external device; and
the BLE module coupled to the backup power source, the BLE module configured to operate using at least some of the electric energy output from the backup power source when the main power source is off, to read the information stored in the shared memory, and to transmit the information to an external device through a wireless communication channel using a BLUETOOTH communication protocol.

7. The apparatus of claim 6, further comprising an automatic switch configured to:
when the main power source is on, receive electric energy from the main power source;
when the main power source is off, switch to receive electric energy from the backup power source; and
provide the received electric energy to the shared memory and to the BLE module.

8. The apparatus of claim 6, wherein the BLE module is further configured to:
switch to a power save mode when a voltage output from the main power source is below a threshold value.

9. The apparatus of claim 6, wherein the BLE module is further configured to:
transmit the information to the external device through the wireless communication channel after switching out of the power save mode.

10. The apparatus of claim 6, wherein the backup power source includes a super capacitor.

11. The apparatus of claim 6, wherein the backup power source includes a rechargeable backup power source, and
wherein the rechargeable backup power source is configured to receive electric energy from the main power source when the main power source is on.

12. The apparatus of claim 6, the processor further configured to:
receive configuration information through the BLE module, the configuration information transmitted to the BLE module from an external device through another wireless communication channel using the BLUETOOTH communication protocol.

13. A system comprising:
an industrial controller configured to control an industrial process in an industrial facility, the industrial controller comprising a processor configured to operate when a main power source is on; and
a BLUETOOTH low energy (BLE) based emergency backup and recovery tool coupled to the industrial controller, the tool comprising:
a backup power source configured to store electric energy and to output electric energy when the main power source is off;
a shared memory configured to be accessed by the processor and a BLE module, to store information written by the processor, and to operate using at least some of the electric energy output from the backup power source when the main power source is off;
switch to a power save mode in response to detecting a communication problem with the processor via a wire connection between BLE module and the processor;
switch out of a power save mode in response to receiving a communication from the external device; and
the BLE module coupled to the backup power source, the BLE module configured to operate using at least some of the electric energy output from the backup power source when the main power source is off, to read the information stored in the shared memory, and to transmit the information to an external device through a wireless communication channel using a BLUETOOTH communication protocol.

14. The system of claim 13, wherein the tool further comprises an automatic switch configured to:
when the main power source is on, receive electric energy from the main power source;
when the main power source is off, switch to receive electric energy from the backup power source; and
provide the received electric energy to the shared memory and to BLE module.

15. The system of claim 13, wherein the BLE module is further configured to:
    switch to a power save mode when a voltage output from the main power source is below a threshold value.

16. The system of claim 13, wherein the BLE module is further configured to:
    transmit the information to the external device through the wireless communication channel after switching out of the power save mode.

17. The system of claim 13, wherein the processor is further configured to:
    receive configuration information through the BLE module, the configuration information transmitted to the BLE module from an external device through another wireless communication channel using the BLUETOOTH communication protocol.

* * * * *